No. 818,420. PATENTED APR. 24, 1906.
R. B. DASHIELL, DEC'D.
E. R. DASHIELL, EXECUTRIX.
BREECH LOADING ORDNANCE.
APPLICATION FILED MAY 27, 1898.

Witnesses
Percy C. Bowen
John Chalmers Fisher

Inventor
R. B. Dashiell,
by Wilkinson + Fisher
Attorneys

No. 818,420. PATENTED APR. 24, 1906.
R. B. DASHIELL, DEC'D.
E. R. DASHIELL, EXECUTRIX.
BREECH LOADING ORDNANCE.
APPLICATION FILED MAY 27, 1898.

Witnesses
Percy C. Bowen
John Chalmers Fisher

Inventor
R. B. Dashiell,
by Wilkinson & Fisher
Attorneys

No. 818,420. PATENTED APR. 24, 1906.
R. B. DASHIELL, DEC'D.
E. R. DASHIELL, EXECUTRIX.
BREECH LOADING ORDNANCE.
APPLICATION FILED MAY 27, 1898.

Witnesses
Percy C. Bowen
John Chalmers Fisher

Inventor
R. B. Dashiell,
by Wilkinson & Fisher,
Attorneys

No. 818,420. PATENTED APR. 24, 1906.
R. B. DASHIELL, DEC'D.
E. E. DASHIELL, EXECUTRIX.
BREECH LOADING ORDNANCE.
APPLICATION FILED MAY 27, 1898.

Witnesses
Percy C. Bowen
John Chalmers Vielé

Inventor
R. B. Dashiell,
by Wilkinson & Fisher,
Attorneys.

No. 818,420. PATENTED APR. 24, 1906.
R. B. DASHIELL, DEC'D.
E. R. DASHIELL, EXECUTRIX.
BREECH LOADING ORDNANCE.
APPLICATION FILED MAY 27, 1898.

Witnesses
Percy C. Bowen.
John Chalmers Tileu.

Inventor
R. B. Dashiell,
by Wilkinson + Fisher,
Attorneys.

UNITED STATES PATENT OFFICE.

ROBERT BROOKE DASHIELL, OF THE UNITED STATES NAVY; ELEANOR RIDOUT DASHIELL EXECUTRIX OF SAID ROBERT BROOKE DASHIELL, DECEASED.

BREECH-LOADING ORDNANCE.

No. 818,420.     Specification of Letters Patent.     Patented April 24, 1906.

Application filed May 27, 1898. Serial No. 681,920.

*To all whom it may concern:*

Be it known that I, ROBERT BROOKE DASHIELL, assistant naval constructor, United States Navy, a citizen of the United States, residing at Washington, in the District of Columbia, have invented certain new and useful Improvements in Breech-Loading Ordnance; and I do hereby declare the following to be a full, clear, and exact description of the invention, such as will enable others skilled in the art to which it appertains to make and use the same.

My invention relates to improvements in breech-loading ordnance of the slotted-screw system of formature; and it especially consists in an improved breech mechanism for opening and closing the breech either by hand or automatically on counter-recoil, improved means for firing the gun, and improved means for ejecting the empty cartridge-case.

My invention also consists in certain novel features and novel combinations and arrangements of parts, as will be hereinafter described and claimed.

Reference is had to the accompanying drawings, in which the same parts are indicated by the same letters throughout the several views.

Fig. 19 is a plan view, and Fig. 20 a rear elevation, of the sear. Fig. 21 is a plan view, and Fig. 22 a rear elevation, of the firing-pin. Fig. 23 is an inverted plan, and Fig. 24 is a rear elevation, of the cartridge-case extractor.

A represents the gun, which while indicated as a solid piece of metal is of course constructed in the usual way.

A' (see Figs. 5 and 6) represents a band fast on the breech of the gun and having the lugs a' for the piston-rods of the recoil-cylinders.

B represents the rocking slide having the trunnions B' mounted in the trunnion-seats C' on the mount C.

D represents one of a pair of hydraulic recoil-cylinders, whose piston-rod E is secured to the lug a' by means of the lock-nuts e, and E' represents one of a pair of buffer-springs, there being one on each piston-rod. The various details of the mount proper are substantially as shown in my Patent No. 573,210, dated December 15, 1896, and entitled "Improvements in gun-mounts," not forming a part of my present invention will not be further described. The breech of the gun-body is provided with the screw-box $A^0$, rounded, as at $a^2$, to allow the breech-block to swing clear without it being necessary to first slide the same to the rear in the carrier-ring. The wall of the screw-box is perforated, as at $A^3$ and $A^4$, to receive the extractor, and this perforation has the straight front wall $a^3$, while in rear of the opening $A^3$ the metal of the gun is allowed to remain undisturbed, as shown at $A^2$. The opposite side of the gun may be recessed, as at $A^5$, to receive the case in which the trigger is mounted.

F represents the hinged carrier provided with the perforated lugs $F'$, pivoted on the hinge-bolt G, mounted in the bracket $A^6$, fast to the side of the breech. The hinged carrier carries a cylindrical collar $F^2$, that projects forward into an annular groove in the rear face of the breech-block and has a notch $f^0$ to receive the trigger, also a groove $f$ concentric with the collar, a guideway $F^3$ for the sliding bar terminating in the wall $f^3$ and provided with the rib $f^4$. The hinged carrier also has a ribbed or dovetailed slot $f^6$ to receive and hold the shank of the cam for operating the extractor.

The breech-block H is provided with the usual interrupted screw-threads, the rear one of which is preferably made continuous, as $h'$. The cylindrical stem $H^2$ projects from the rear of the breech-block and fits snugly in the collar $F^2$ of the hinged carrier. Exterior to this stem $H^2$ is the annular groove $H^0$, into which the cylindrical collar $F^2$ projects, as has been before described. The cylindrical stem $H^2$ has the cylindrical chamber $H^3$ therein, which is separated from the smaller cylindrical chamber $H^4$ by an interrupted flange, preferably composed of two fan-shaped ribs $h^3$, each subtending an angle of slightly less than ninety degrees and separated by the blanks $h^4$. In front of this chamber $H^4$ is the chamber $H^5$, terminating in the opening $h^5$ for the firing-pin. The cylindrical chamber $H^3$ is provided with the cocking cam-groove $H^6$, having the cam-face $h^{15}$ and the straight wall $h^9$. The rear face of the breech-block also carries the studs $h$ and $h^7$, the latter of which is preferably provided with an anti-friction-roller $h^6$.

$h^0$ represents the notch for locking the breech-block in the carrier when the screw-threads are disengaged.

K represents a detachable housing used to secure the breech-block in the carrier-ring and also to furnish a housing for the firing-bolt and the various other parts of the firing mechanism carried by the hinged carrier. This housing is provided with a cylindrical hub $K'$, that fits snugly in the chamber $H^3$ of the breech-block, which hub terminates in a stem $K^2$ of smaller diameter adapted to engage in the chamber $H^5$ of the breech-block and with the fan-shaped wings or ribs $k$, adapted to pass through blanks $h^4$ and engage in the chamber $H^4$ behind the ribs $h^3$, thus forming a bayonet-joint. By having the angle of engagement of these ribs $k$ and $h^3$ (which as shown is about ninety degrees) greater than the angle of engagement of the screw-threads of the breech-block and gun (which as shown is about forty-five degrees) the housing K cannot be disengaged by the ordinary motion of turning the breech-block in the hinged carrier; but yet the housing may be readily removed from or inserted in the breech-block by turning the housing through the requisite angle in the breech-block and then withdrawing the housing to the rear, or vice versa.

Figure 17:
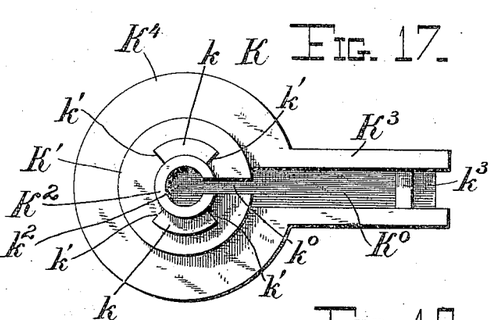
Fig. 17 is a front view, and Fig. 18 a plan view, of the device for holding the breech-block securely in the hinged carrier and in which part of the firing mechanism is mounted.

The stem $K^2$, as also the hub $K'$, are hollowed out, as at $k^2$, to receive the firing-bolt M and are also slotted, as at $k^0$, to permit the passage therethrough of the web $M^2$ of the firing-bolt. The housing K is provided with a head $K^4$, carrying the laterally-extending arm $K^3$, grooved, as at $K^0$, to form a guideway for the sear N. Across the bottom of this groove $K^0$ runs the rib $k^3$. (See Fig. 17.)

Figures 18, 19, 20, 21, 22, 23, 24:
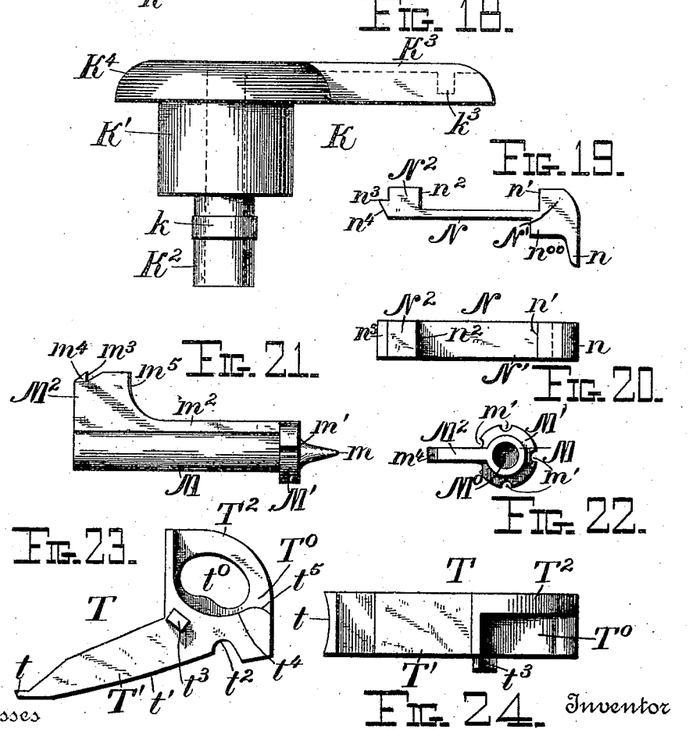
Figure 25:
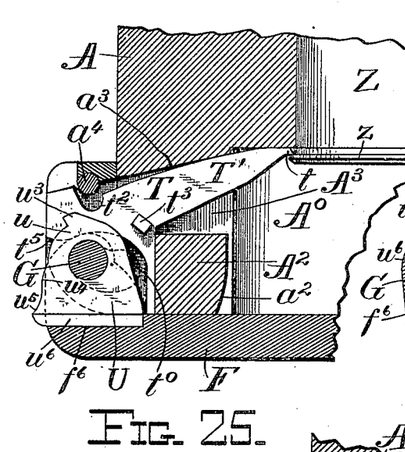
Figs. 25, 26, and 27 are inverted detail views showing the extractor and cam for operating the same from beneath and illustrating the combined effect of the extractor and cam in locking the breech mechanism in the open position until the extractor is automatically tripped by the insertion of a fresh cartridge-case and the breech mechanism is released.
Figure 26:
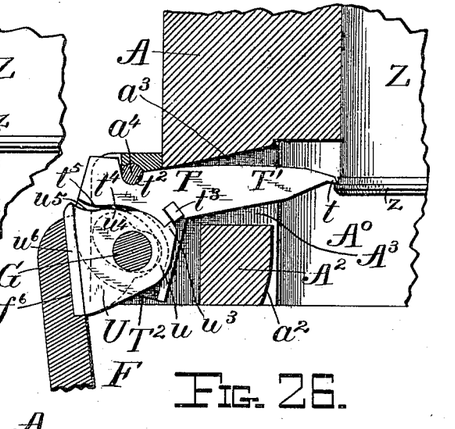

The firing-bolt M is hollowed out, as at $M^0$, to receive the firing-spring $M^3$ (see Figs. 2 and 22) and is provided with the firing-pin $m$ in front of the head $M'$, engaging in the chamber $H^5$ of the breech-block and provided with slots $m'$ to permit the passage of the gases to the rear from "blowbacks." The firing-bolt is also provided with a web $M^2$ to travel in the slot $k^0$, which rib is reduced, as at $m^2$, to correspond with the reduced thickness of the stem $K^2$, is curved, as at $m^5$, and has the cocking-notch $m^3$ and the inclined face $m^4$. (See Fig. 21.)

Figure 1:
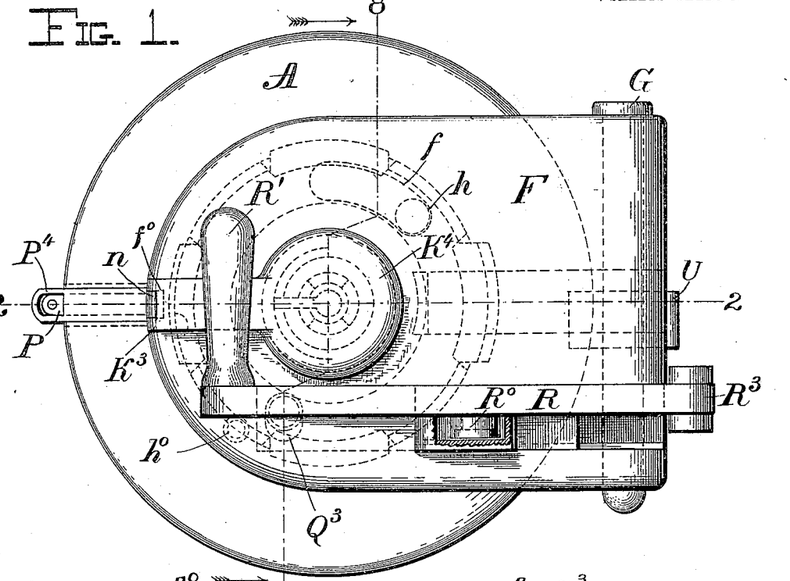
Figure 1 represents a rear view of the breech of the gun.
Figure 2:
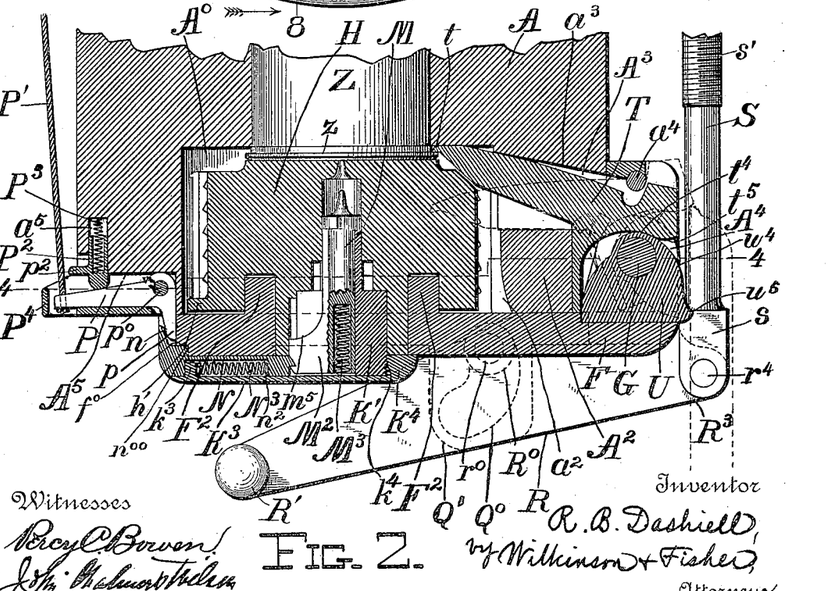
Fig. 2 represents a section along the line 2 2 of Fig. 1 and looking down, parts being shown in plan.
Figure 3:
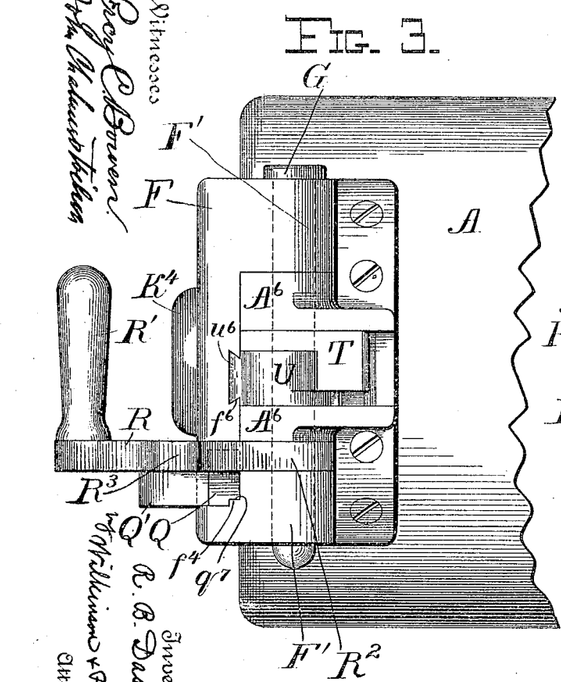
Fig. 3 is a side elevation of the breech of the gun as seen from the right of Figs. 1 and 4.
Figure 4:
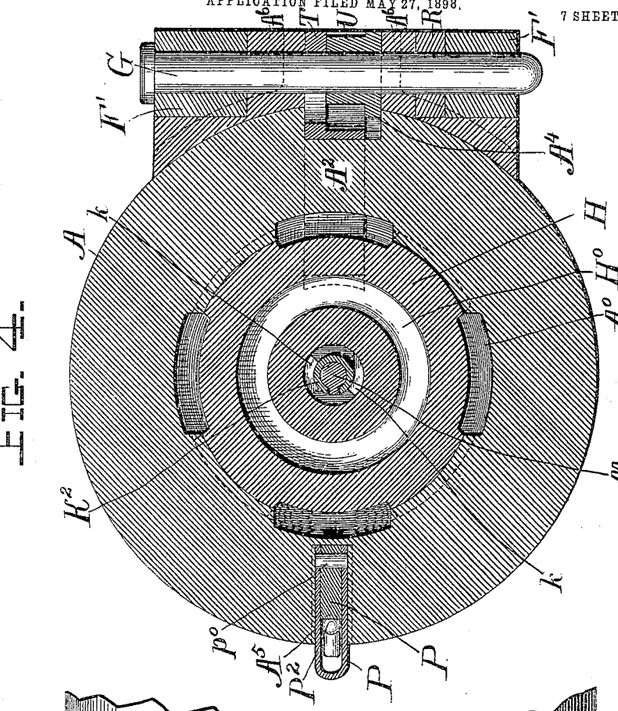
Fig. 4 represents a broken transverse section through the breech of the gun, the section being along the broken line 4 4 of Fig. 2.

N represents the sear, consisting, essentially, of two end lugs $N'$ and $N^2$ on a flat plate. The front lug $N^2$ has the inclined cocking-face $n^4$, the cocking-notch $n^3$, and the shoulder $n^2$ for the sear-spring $N^3$. The rear lug $N'$ has a shoulder $n'$, adapted to engage the rib $k^3$ of the housing K, the shoulder $n^0$, adapted to limit the inward travel of the sear, and the firing-toe $n$. The sear-spring $N^3$ is mounted under compression between the shoulder $n^2$ and the rib $k^3$, as shown in Fig. 2. The sear is provided with a lug $n^{00}$, which engages with the notch $f^0$ in the carrier-ring when the firing attachment is in place in the breech-block, and by this engagement said attachment is prevented from rotating with the breech-block. The depth of this groove $f^0$ and the corresponding length of the lug $n^{00}$ are greater than the depth of the engagement of the sear with the firing-pin, so that the sear may be moved to release the firing-pin, and yet the lug $n^{00}$ would still lock the housing against turning in the carrier.

The trigger P is preferably in the form of a bell-crank lever pivoted, as at $p^0$, in the housing $P^4$, which slides in a dovetailed recess in the rear face of the gun. One arm $p$ of this bell-crank lever passes under the firing-toe $n$ of the sear when the carrier is swung to the closed position. The other arm of the bell-crank lever P has the lanyard P' attached thereto; but any other suitable means for moving the trigger may be adopted, if desired. The outer arm of the trigger P is normally pressed rearward by means of the hollow spring-plunger $P^2$, mounted in a recess $a^5$ in the gun and pressed forward by means of the spring $P^3$. For convenience in inserting and removing this plunger when desired it is preferably provided with a thumb-lug $p^2$, traveling in a slot in the gun, as shown in Fig. 2.

Figure 14:
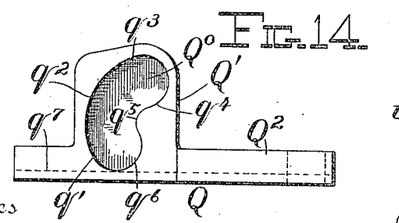
Fig. 14 is a plan view of the sliding bar shown in Fig. 13.
Figure 16:
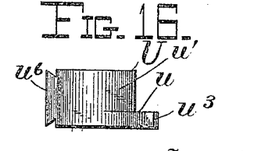

Q represents a sliding bar for rotating the breech-block which travels in the guideway $F^3$ of the hinged carrier, the groove $q^7$ sliding over the rib $f^4$ and the bar sliding transversely in the carrier, as shown in Figs. 3 and 11 to 14. This bar Q is provided with a rearwardly-extending arm Q' with cam-groove $Q^0$ on the upper side thereof, with cam-surfaces $q'$ to $q^6$, as shown in Fig. 14. The inner end of the bar is made to project upward at right angles to the plane of the arm Q', and this portion of the bar is provided with an elongated recess or opening $Q^3$, adapted to engage the roller $h^6$ in the stud $h^7$ of the breech-block.

The operating-lever R is pivoted on the hinge-bolt G and is provided with a long arm with handle R', attached for operating the breech mechanism by hand, and with a short arm $R^3$, perforated, as at $r^3$, for coupling to the rod S of the automatic mechanism. The operating-lever carries a stud $r^0$ with anti-friction-roller $R^0$, which engages in the cam-groove $Q^0$ of the bar Q.

The extractor T has the arm T', projecting into the opening $A^3$ in the gun-body and terminating in the nib $t$ to engage the rim $z$ of the cartridge-case Z. The front face of the arm T' is slightly rounded, as at $t'$, to roll along the face $a^3$, and thus secure a shifting pivot center and accelerated motion in ejecting the empty cartridge-case. The heel $T^2$ of the extractor is chambered, as at $T^0$, and perforated, as at $t^0$, to slip over the hinge-bolt and yet to be given the requisite play thereon. The wall of the chamber $T^0$ is rounded, as at $t^4$ and $t^5$, for reasons which will be hereinafter stated. The curved front face $t'$ of the extractor terminates in the groove $t^2$, and the lower face of the extractor carries the lug $t^3$ for holding the breech mechanism open until the extractor has been tripped.

Figure 27:
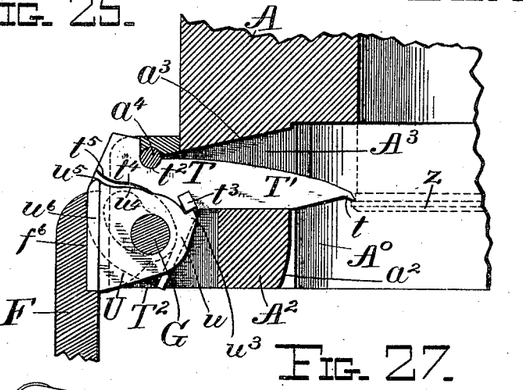

The cam U for operating the extractor has a dovetailed heel $u^6$, held in the recess $f^6$ in the hinged carrier. This cam is perforated, as at $u^0$, to slip over the hinge-bolt G, and it is thus held fast in and rotates with the hinged carrier. The cam U has the web $u$, provided with the catch $u^3$ to project beneath the extractor and engage the lug $t^3$ when the extractor is in the rearward position, while the part $u'$ of the cam projects into the chamber $T^0$ of the extractor and is provided with curved faces $u^4$ and $u^5$, registering with the curved faces $t^4$ and $t^5$ of the extractor when the latter is in its most rearward position, as shown in Fig. 27.

Since the coöperation of the various parts of the breech mechanism is the same whether operated by hand or automatically, for the sake of clearness I will describe the operation of the breech mechanism before passing on to the description of the automatic mechanism.

Assuming the breech mechanism to be in the closed position just after the gun has been fired, the first part of the motion of the operating-lever R will cause the roller $R^0$ to run down the cam-groove $Q^0$ from the position $q'$ toward $q^2$. This will start the sliding bar slowly, but under great power, causing the slow but forcible rotation of the block in the carrier from the locked position. The cam-groove is of quicker pitch toward $q^3$, so that when the bar nears the end of its travel, as shown in Fig. 2, the motion of unlocking the screw-threads will be comparatively rapid. The angle of rotation of the breech-block in the carrier is limited by the travel of the stud $h$ in the groove $f$, and when this is reached further motion of the bar Q is prevented and the carrier swings about the hinge-bolt as a center, swinging the breech-block clear of the gun. Any of the various well-known means for locking the breech-block in the carrier when the latter is clear of the gun may be employed, but I prefer that described in my application entitled "Improvements in rapid-fire guns," Serial No. 674,095, filed March 16, 1898; but for the sake of clearness in the drawings such means have been omitted as forming no part of my present invention. As the hinged carrier swings outward the cam-face $u^4$ will engage the cam-face $t^4$ of the extractor, as shown in Fig. 2, and will combine the slow but powerful wedging effect of the cam upon the extractor acting at its longest leverage-arm. This will give great power in starting the empty cartridge-case, and as the cam continues to revolve the curved front face $t'$ of the extractor rolls along the wall $a^3$, shortening the leverage-arm, while at the same time the shape of the cam gives increased speed with less power, so that the combined result is a rapidly-accelerating motion of the extractor with corresponding decrease of power. When the extractor nears the end of its stroke, the recess $t^2$ passes over the pin $a^4$, fast to the gun, the pivot of the extractor is shifted to the axis of this curved recess $t^2$, and the cam-surfaces $t^5$ and $u^5$ now engaging each other a quick sharp final motion is given to the extractor, by means of which the cartridge-case is rapidly ejected or thrown to the rear. When in their most rearward position, the lug $t^3$ on the extractor engages the catch $u^3$ on the cam, as shown in Fig. 27, and the breech of the gun is held open until the extractor is moved forward either by the insertion of a fresh cartridge-case or by hand.

In closing the breech the extractor is first swung forward about its pivot until the lug $t^3$ is disengaged from the catch $u^3$, (this is accomplished automatically by the insertion of a fresh cartridge-case, but it may also be done by hand, as in drilling,) and then the operating-lever is swung in the reverse direction. As soon as the breech-block is in the screw-box and the hinged carrier flush with the breech of the gun the bar Q will begin to move, causing the cam-faces $q^4$ and $q^5$ to give a quick turn to the breech-block, followed by the slow but powerful wedging effect of the cam-face $q^6$, which causes the block to lock firmly in the screw-box. During the operation of closing the breech the extractor is returned to the initial position.

The description of the opening and closing of the breech has so far purposely omitted the operation of the firing mechanism, which may also be applied to almost any of the well-known breech mechanisms now in use. The operation of the firing mechanism is as follows: The parts being in the position shown in Fig. 2, if the lanyard P' be pulled the sear will be drawn outward, releasing the firing-bolt, which will be pressed forward by its spring, firing the cartridge, the bolt then remaining in the forward position. The curved shoulder $m^5$ of the web $M^2$ of the firing-bolt will then project into the forward part of the cam-groove $H^6$. As the breech-block is rotated in opening the breech this shoulder $m^5$ rides up the cam-face $h^{15}$, forcing the firing-bolt to the rear until the inclined face $m^4$ presses back the inclined face $n^4$ of the sear, causing the notch $m^3$ of the firing-bolt to engage the catch $n^3$ of the sear, when the firing-bolt will be held in the cocked position until released by withdrawing the sear, as in firing the gun. The motion of the breech-block in returning to the locked position will swing the shoulder $m^5$ clear of the cam-face $h^{15}$ and near the side wall $h^9$ of the cam-groove $H^2$, when the firing-bolt will be free to move forward when released by the sear.

It will be seen that the sear is protected from being accidentally drawn outward until the breech is closed, when the toe $n$ of the sear swings over the toe $p$ of the trigger, and the parts are in the firing position.

It will be seen that all the parts of the firing mechanism carried by the hinged carrier may be removed at one operation, and either a fresh housing containing new parts may be substituted therefor or fresh parts of the mechanism may be supplied.

Figure 5:
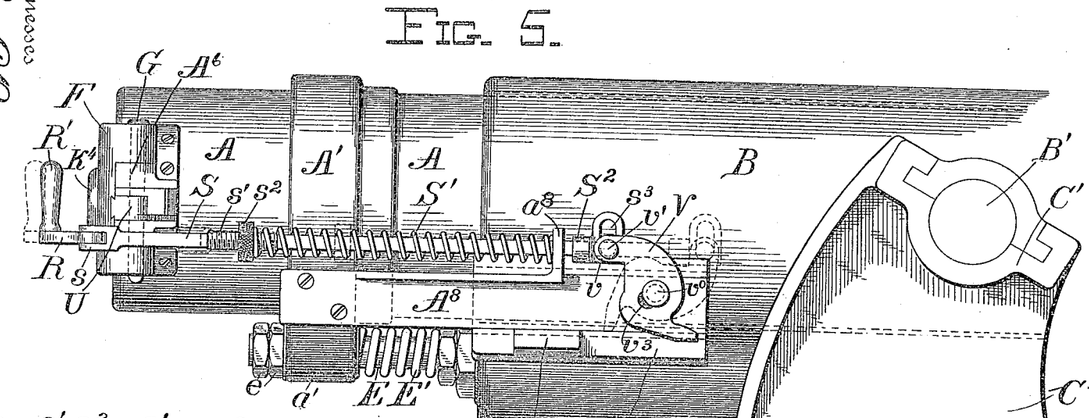
Fig. 5 is a side elevation of a portion of the gun-mount and shows the rear half of the gun with the automatic mechanism for operating the breech mechanism, the gun being shown in the initial position or "run out.
Figure 6:
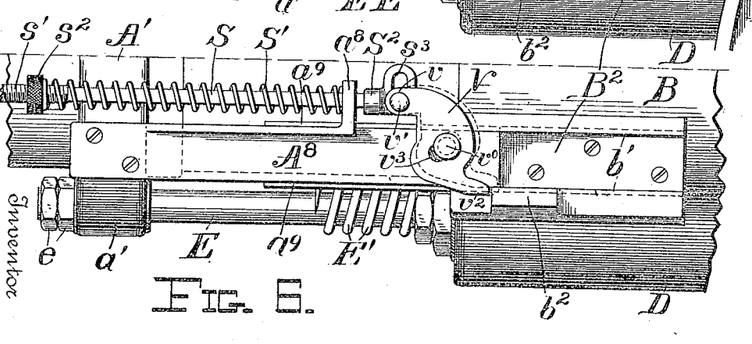
" Fig. 6 is a similar though fragmentary view and shows the position of the automatic mechanism just after the gun has recoiled and just after it has started forward on counter-recoil.
Figure 7:
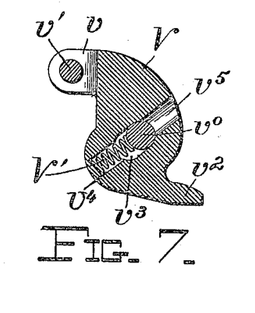
Fig. 7 is a detail view showing a central longitudinal section through the tripping-lever by means of which the automatic mechanism is operated.
Figure 8:
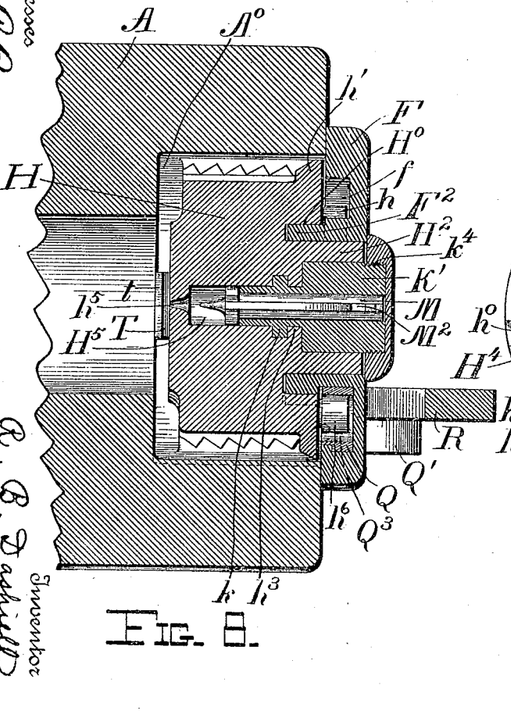
Fig. 8 represents a section through the breech of the gun along the broken line 8 8 of Fig. 1 and looking in the direction of the arrows.
Figures 9, 10:
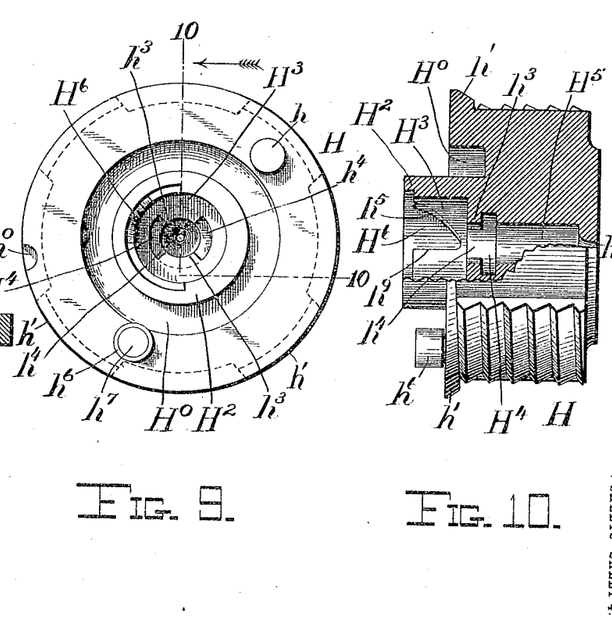
Fig. 9 is a rear elevation of the breech-block as detached from the hinged carrier and with the firing mechanism removed therefrom.
Fig. 10 is a sectional elevation of the breech-block, the section being along the broken line 10 10 of Fig. 9 and parts being broken away.
Figure 11:
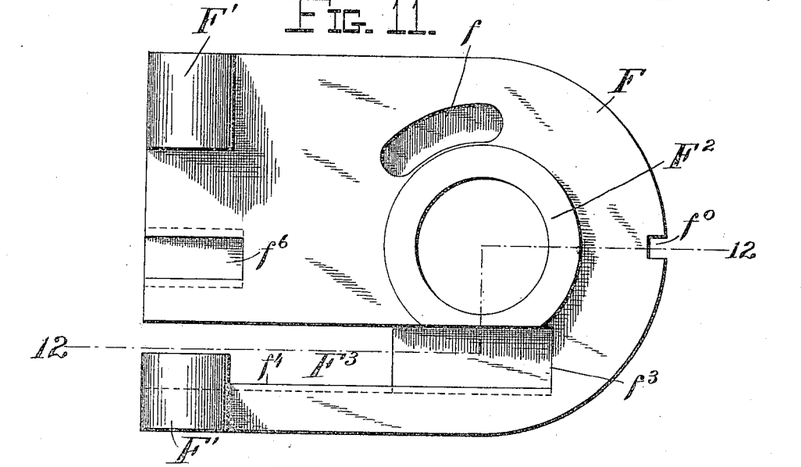
Fig. 11 is a front elevation of the hinged carrier as detached from the gun.
Figures 12, 13, 15:
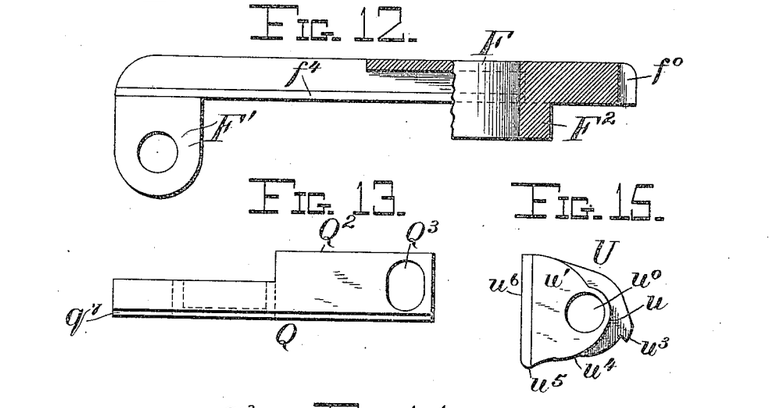
Fig. 12 represents a section along the broken line 12 12 of Fig. 11 and looking down.
Fig. 13 is a side elevation of the sliding bar used for rotating the breech-block for locking and unlocking the same from engagement with the screw-box in the gun.
Fig. 15 is an inverted plan view, and Fig. 16 an end elevation, of the cam for operating the cartridge-case extractor and for holding the breech mechanism open until automatically released.
Figure 28:
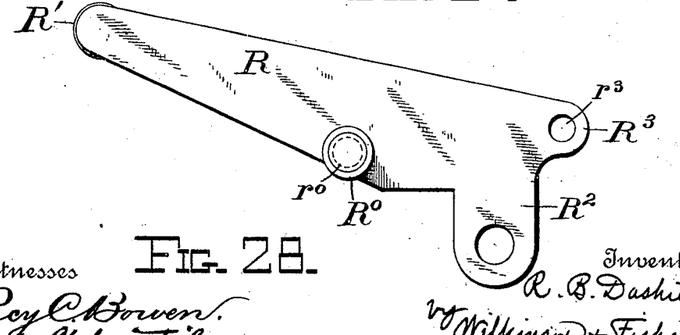
Fig. 28 is an inverted plan view of the operating-lever for operating the breech mechanism.

The operation of the breech-closure and of the firing mechanism is the same, whether actuated by hand or automatically, and so it will be sufficient to merely describe the automatic means whereby the operating-lever is moved from the closed to the open position or vice versa. In the automatic mechanism the breech is opened automatically on counter-recoil, is held open by the extractors until released, and is then closed by the stored-up energy of a spring, as will be now described. Reference is had particularly to Figs. 5 to 7, in which S represents a rod secured by the yoke $s$ to the short arm $R^3$, Fig. 28, of the operating-lever R. This rod S has part of its length enlarged and screw-threaded, as at $s'$. Obviously a screw-threaded sleeve might be used on a cylindrical rod, if preferred, and on this screw-threaded portion the milled or knurled adjusting-nut $s^2$ is mounted to adjust the compression of the coil-spring S', which surrounds the rod S and abuts at one end against the nut $s^2$ and at the other end against the lug $a^8$ of the bracket $A^8$, fast to the band A'. This bracket is provided with dovetailed ribs $a^9$, traveling beneath guide-ribs $b'$ in the guide-plate $B^2$, fast to the rocking slide B. Thus the bracket $A^8$ recoils with the gun, but is guided by the guide-plate $B^2$. This plate $B^2$ is provided with a projecting portion $b^2$ to engage the inclined toe $v^2$ of the lever V, which is pivoted on the stud $v^0$, fast to the bracket $A^8$, and has the end $v$ connected by the pin $v'$ to the head $S^2$ of the rod S. The pin $v'$ passes through an elongated slot $s^3$ in the head $S^2$ to permit the requisite play. In order that the lever V may rise and pass over the projection $b^2$ during recoil, the pivot-hole $v^3$ for the pin $v^2$ is made elongated, as shown in Fig. 7, and is also pierced partly through, as at $v^5$, to receive the spring, which bears against the pivot-pin $v^0$ and presses the lever downward toward the lug $b^2$.

The parts being in the initial position shown in Fig. 5 and the breech being closed, suppose the gun to be fired. The gun will recoil to the rear to the position shown in Fig. 6, (any further recoil will not impair the operation of the automatic mechanism,) when the toe $v^2$ will be pressed by the spring V' down in rear of the lug $b^2$, and as the gun moves forward on counter-recoil the toe $v^2$, engaging the lug $b^2$, will cause the lever V to rotate about its pivot $v^0$, moving the rod S to the right, as shown in dotted lines in Fig. 5, and opening the breech of the gun, at the same time compressing the spring S' between the nut $s^2$ and the lug $a^8$ and storing up energy to close the breech. The breech mechanism is held open by the extractors, as before described, until the latter are tripped, and then the stored-up energy in the spring S' will close the breech automatically. There should be a slight initial compression on the spring S', just sufficient to insure the efficient closing of the breech, and this compression can best be determined experimentally by means of the adjusting-nut $s^2$. Moreover, this adjusting-nut affords a ready means for adjusting the compression on the spring should the strength of the latter decrease or should the parts work stiff, due to clogging up, heat, or other causes.

It will be obvious that the automatic attachment as just described may be applied to almost any of the semi-automatic breech-closures where the breech mechanism in opening or closing is operated by a single continuous motion of a lever or reciprocating part.

It will also be obvious that various modifications might be made in the herein-described apparatus which could be used without departing from the spirit of my invention.

Having thus described my invention, what I claim, and desire to secure by Letters Patent of the United States, is—

1. In a breech mechanism for breech-loading guns, the combination of an operating-lever, and mechanism for opening and closing the breech operated by said lever, of means for operating said lever, consisting of a lever moving with the gun and provided with a tripping-toe, a rod connecting said lever and the operating-lever, a coil-spring mounted on said rod and normally pressing the same in one direction, and a projection on the gun-mount adapted to strike the tripping-toe on counter-recoil, and to move said rod against the action of said spring, substantially as described.

2. In a breech mechanism for breech-loading guns, the combination of an operating-lever, and mechanism for opening and closing the breech operated by said lever, of means for operating said lever, consisting of a lever moving with the gun and provided with a tripping-toe, a rod connecting said lever and the operating-lever, a coil-spring adjustably mounted on said rod and normally pressing the same in one direction, and a projection on the gun-mount adapted to strike the tripping-toe on counter-recoil, and to move said rod against the action of said spring, substantially as described.

3. In a breech mechanism for breech-loading guns, the combination of an operating-lever, and mechanism for opening and closing the breech operated by said lever, of means for operating said lever, consisting of a lever moving with the gun and provided with a tripping-toe, a rod connecting said lever and the operating-lever, a coil-spring mounted on said rod and normally pressing the same in one direction, an adjusting-nut mounted on said rod for adjusting the compression on said spring, and a projection on the gun-mount adapted to strike the tripping-toe on counter-recoil, and to move said rod against the action of said spring, substantially as described.

4. In a breech mechanism for breech-loading guns, the combination of an operating-lever, and mechanism for opening and closing the breech operated by said lever, of means for operating said lever, consisting of a lever moving with the gun and provided with a tripping-toe, the said lever having an elongated pivot-hole with a spring normally pressing the tripping-toe toward the engaging projection on the gun-mount, a rod connecting said lever and the operating-lever, a coil-spring mounted on said rod and normally pressing the same in one direction, and a projection on the gun-mount adapted to strike the tripping-toe on counter-recoil, and to move said rod against the action of said spring, substantially as described.

5. In a breech mechanism for breech-loading guns, the combination of an operating-lever, and mechanism for opening and closing the breech operated by said lever, of means for operating the said lever, consisting of a lever moving with the gun and provided with a tripping-toe, the said lever having an elongated pivot-hole with a spring normally pressing the tripping-toe toward the engaging projection on the gun-mount, a rod connecting said lever and the operating-lever, a coil-spring mounted on said rod and normally pressing the same in one direction, an adjusting-nut mounted on said rod for adjusting the compression on said spring, and a projection on the gun-mount adapted to strike the tripping-toe on counter-recoil, and to move said rod against the action of said spring, substantially as described.

6. In a breech mechanism for breech-loading guns of the slotted-screw system, the combination with the breech-block and hinged carrier, of an operating-lever, with mechanism for opening and closing the breech and a cartridge-case extractor both operated by said lever, of means for operating said lever, consisting of a lever moving with the gun and provided with a tripping-toe, a rod connecting said lever and the operating-lever, a coil-spring mounted on said rod and normally pressing the same in one direction, and a projection on the gun-mount adapted to strike the tripping-toe on counter-recoil, and to move said rod against the action of said spring and to open the breech, and means operated by the extractor for holding the breech open until released, substantially as described.

7. In a breech mechanism for breech-loading guns of the slotted-screw system, the combination with the breech-block and hinged carrier, of an operating-lever, with mechanism for opening and closing the breech and a cartridge-case extractor both operated by said lever, of means for operating said lever, comprising a lever moving with the gun and provided with a tripping-toe, a rod connecting said lever and the operating-lever, a coil-spring adjustably mounted on said rod and normally pressing the same in one direction, and a projection on the gun-mount adapted to strike the tripping-toe on counter-recoil, and to move said rod against the action of said spring and to open the breech, and means automatically operated by the extractor for holding the breech open until the extractor is pressed forward, substantially as described.

8. In a breech mechanism for breech-loading guns of the slotted-screw system, the combination with the breech-block and hinged carrier, of an operating-lever, with mechanism for opening and closing the breech and a cartridge-case extractor both operated by said lever, of means for operating said lever, comprising a lever moving with the gun and provided with a tripping-toe, a rod connecting said lever and the operating-lever, a coil-spring mounted on said rod and normally pressing the same in one direction, an adjusting-nut mounted on said rod for adjusting the compression on said spring, and a projection on the gun-mount adapted to strike the tripping-toe on counter-recoil, and to move said rod against the action of said spring to open the breech, and means automatically operated by the extractor for holding the breech mechanism in the open position and for releasing the same when desired, substantially as described.

9. In a breech mechanism for breech-loading guns, the combination with the breech-block and hinged carrier, of a cartridge-case extractor, automatic means for swinging said hinged carrier to the open position on counter-recoil, means automatically controlled by said extractor for holding the said hinged carrier in the open position, or for releasing the same when desired, and automatic means for closing the breech when the hinged carrier is released, substantially as described.

10. In a breech mechanism, the combination with a gun-body provided with a screw-box, a hinged carrier, a breech-block carried thereby, a cartridge-case extractor, and means operated by said extractor for holding the carrier open until released, substantially as described.

11. In a breech mechanism, the combination with a gun-body provided with a screw-box, a hinged carrier, a breech-block carried thereby, a cartridge-case extractor, means operated by said extractor for holding the carrier open until released, and means automatically operated by the insertion of the shell for tripping said extractor, and thus releasing the carrier, substantially as described.

12. In breech-loading ordnance, the combination with a gun-body having a slot through the walls thereof for the cartridge-case extractor, of a hinged carrier pivoted to said gun-body, a cartridge-case extractor loosely mounted in said gun-body and provided with a curved front face adapted to roll along the forward wall of said slot in the gun-body, and provided with double cam-surfaces on its heel, of a double-acting cam rigidly attached to the hinged carrier and engaging one set of said cam-surfaces on the extractor for ejecting the empty cartridge-case, and the other set of cam-surfaces on the extractor for restoring the latter to the initial position, substantially as described.

13. In breech-loading ordnance, the combination with a hinged carrier, and a breech-block carried thereby, of a detachable housing securing the breech-block on the carrier, and firing mechanism mounted in said housing, substantially as described.

14. In breech-loading ordnance, the combination with a hinged carrier, and a breech-block carried thereby, a firing-pin mounted in said breech-block, a detachable housing securing the breech-block on the carrier, a sliding sear mounted in said housing and engaging said firing-pin, and means for cocking said firing-pin and for releasing said sear, substantially as described.

In testimony whereof I affix my signature in presence of two witnesses.

ROBERT BROOKE DASHIELL.

Witnesses:
  H. O. WEAVER,
  PATRICK O'DEA.